(12) United States Patent
Wijekoon et al.

(10) Patent No.: US 9,030,852 B2
(45) Date of Patent: May 12, 2015

(54) SYSTEM FOR POWER CONVERSION UTILIZING MATRIX CONVERTERS

(75) Inventors: Piniwan Thiwanka Bandara Wijekoon, Munich (DE); Said Farouk Said El-Barbari, Freising (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/484,302

(22) Filed: May 31, 2012

(65) Prior Publication Data

US 2013/0322132 A1   Dec. 5, 2013

(51) Int. Cl.
| H02M 5/45 | (2006.01) |
|---|---|
| H02M 5/297 | (2006.01) |
| H02M 1/12 | (2006.01) |
| H02M 5/293 | (2006.01) |

(52) U.S. Cl.
CPC .............. *H02M 5/297* (2013.01); *H02M 1/126* (2013.01); *H02M 2001/123* (2013.01); *H02M 2005/2932* (2013.01)

(58) Field of Classification Search
USPC ........................... 363/37, 39, 40, 98, 131, 132
See application file for complete search history.

(56) References Cited

U.S. PATENT DOCUMENTS

| 5,852,558 | A | 12/1998 | Julian et al. |
|---|---|---|---|
| 6,882,550 | B1 | 4/2005 | Baumgart |
| 7,126,409 | B2 * | 10/2006 | Nielsen .......................... 327/391 |
| 7,317,998 | B2 | 1/2008 | Lacaze et al. |
| 7,439,714 | B2 * | 10/2008 | Llorente Gonzalez et al. . 322/24 |
| 7,778,045 | B2 * | 8/2010 | Alexander ....................... 363/13 |
| 8,345,452 | B2 * | 1/2013 | Alexander ....................... 363/17 |
| 8,400,800 | B2 * | 3/2013 | Alexander .................... 363/123 |
| 2009/0090546 | A1 | 4/2009 | Mechi |
| 2009/0153113 | A1 | 6/2009 | Zilberberg |
| 2010/0091534 | A1 | 4/2010 | Tadano |
| 2010/0148706 | A1 | 6/2010 | Haga et al. |
| 2010/0244570 | A1* | 9/2010 | Sakakibara ...................... 307/75 |
| 2012/0020129 | A1* | 1/2012 | Alexander .................... 363/123 |

OTHER PUBLICATIONS

Carlos Juri M et al.; The Application of Resonant Controllers to 4-Leg Matrix Converters Feeding Unbalanced or Non-Linear Loads; International Conference and Fair on Education, Research & Employment in the Renewable; ICERE 2010 CHILE; 21 Pages.

Wesam M. Rohouma et al.; A Four Legs Matrix Converter Based Ground Power Unit with Selective Harmonic Control; Energy Conversion Congress and Exposition (ECCE), 2011 IEEE; pp. 799-805.

Hong-Hee Lee et al.; A Study on Reduction of Common-Mode Voltage in Matrix Converter with Unity Input Power Factor and Sinusoidal Input/Output Waveforms; Industrial Electronics Society, 2005. IECON 2005. 31st Annual Conference of IEEE; pp. 1210-1216.

(Continued)

*Primary Examiner* — Bao Q Vu

(74) *Attorney, Agent, or Firm* — Seema S. Katragadda

(57) ABSTRACT

A power conversion device according to the aspects of the present technique is presented. The device includes a first converter and a second converter operatively coupled to the first converter. Moreover, the device includes a phase leg operatively coupled between the first converter, the second converter, where the phase leg includes a first unidirectional switch, a second unidirectional switch operatively coupled to the first unidirectional switch, and a first bidirectional switch, where a first end of the first bidirectional switch is operatively coupled to at least one of the first unidirectional switch and the second unidirectional switch.

20 Claims, 3 Drawing Sheets

(56) References Cited

OTHER PUBLICATIONS

Fan Yue et al.; Cancellation of 3rd Common-mode Voltage Generated by Matrix Converter; Industrial Electronics Society, 2005. IECON 2005. 31st Annual Conference of IEEE; pp. 1217-1222.

Fan Yue et al.; A Novel Four-leg Matrix Converter; IEEE Industrial Electronics, IECON 2006—32nd Annual Conference; pp. 2694-2699.

Sudarat Khwan-On et al.; Fault Tolerant Four-Leg Matrix Converter Drive Topologies for Aerospace Applications; Industrial Electronics (ISIE), 2010 IEEE International Symposium; pp. 2166-2171.

Tuyen D. Nguyen et al.; Carrier-based PWM Method for Four-Leg Very Sparse Matrix Converter; 8th International Conference on Power Electronics—ECCE Asia May 30-Jun. 3, 2011, The Shilla Jeju, Korea; pp. 1703-1710.

P.W. Wheeler et al.; A Utility Power Supply Based on a Four-Output Leg Matrix Converter; IEEE Transactions on Industry Applications, vol. 44, No. 1, Jan./Feb. 2008; pp. 174-186.

Richard Zhang; High Performance Power Converter Systems for Nonlinear and Unbalanced Load/Source; Dissertation submitted to the Faculty of the Virginia Polytechnic Institute and State University in partial fulfillment of the requirements for the degree of Doctor of Philosophy; in Electrical and Computer Engineering; Nov. 17, 1998; 335 Pages.

Yao Sun et al.; Indirect Four-Leg Matrix Converter Based on Robust Adaptive Back-Stepping Control; IEEE Transactions on Industrial Electronics, vol. 58, No. 9, Sep. 2011; pp. 4288-4298.

Han Ju Cha et al.; an Approach to Reduce Common-Mode Voltage in Matrix Converter; IEEE Transactions on Industry Applications, vol. 39, No. 4, Jul./Aug. 2003; pp. 1151-1159.

Domenico Casadei et al; Reduction of the Input Current Harmonic Content in Matrix Converters Under Input/Output Unbalance; IEEE Transactions on Industrial Electronics, vol. 45, No. 3, Jun. 1998; pp. 401-411.

\* cited by examiner

SYSTEM FOR POWER CONVERSION UTILIZING MATRIX CONVERTERS

BACKGROUND

The system relates generally to power conversion and more specifically to power conversion that employs a matrix converter (MC).

The matrix converter is typically used to convert one form of power to another form of power. Accordingly, in one example, the matrix converter may be employed to convert one form of alternating current (AC) to another form of alternating current.

Furthermore, the matrix converter is inherently a bidirectional power flow converter. The matrix converter offers several advantages over an ordinary back to back AC to AC converter with a direct current (DC) link. For example, the matrix converter circumvents the need for bulky passive components for power conversion such as DC link capacitors, boost inductors, and the like. Hence, the matrix converter offers a better solution for applications that require higher power density.

Generally, matrix converters have lower immunity to disturbances in the load and power source/supply. By way of example, a non-linear or unbalanced output load may introduce common mode harmonics in the matrix converter. Furthermore, these common mode harmonics tend to distort the quality of an output voltage/current waveform of the matrix converter. Additionally, these common mode harmonics also result in mechanical vibrations, extra thermal losses, and additional stresses in a drive train.

Currently, the common mode harmonics in the matrix converters are reduced by employing complex modulation techniques. Unfortunately, these techniques limit the output voltage capability due to unavailability of energy storage elements. There is an on-going need to improve the power conversion technology employing the matrix converter.

BRIEF DESCRIPTION

In accordance with aspects of the present technique, a power conversion device is presented. The device includes a first converter and a second converter operatively coupled to the first converter. Moreover, the device includes a phase leg operatively coupled between the first converter and the second converter, where the phase leg includes a first unidirectional switch, a second unidirectional switch operatively coupled to the first unidirectional switch, and a first bidirectional switch, where a first end of the first bidirectional switch is operatively coupled to at least one of the first unidirectional switch and the second unidirectional switch.

In accordance with another aspect of the present technique, a system is presented. The system includes a power source. Furthermore the system includes a first converter, where a first port of the first converter is operatively coupled to the power source. Also, the system includes a second converter, where a first port of the second converter is operatively coupled to a second port of the first converter. Furthermore, the system includes a load operatively coupled to a second port of the second converter. Additionally, the system includes a phase leg operatively coupled between the first converter and the second converter, where the phase leg includes a first unidirectional switch, a second unidirectional switch operatively coupled to the first unidirectional switch, and a first bidirectional switch, where a first end of the first bidirectional switch is operatively coupled to at least one of the first unidirectional switch and the second unidirectional switch.

In accordance with yet another aspect of the present technique, a method for converting power is presented. The method includes determining a switching pattern of one or more switches in a phase leg using a control unit. Further, the method includes at least one of activating or deactivating the one or more switches in the phase leg based on the determined switching pattern. Also, the method includes generating a balancing signal based on the at least one of activating or deactivating the one or more switches in the phase leg. In addition, the method includes minimizing a common mode signal in a system employing the balancing signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system for converting power and a method for converting power are presented. By employing the system for converting power and a method for converting power described hereinafter, a compact system for converting power that effectively reduces common mode signals is presented. The term common mode signal as used herein may include a common mode voltage, a common mode current, and the like. Moreover, the common mode signal may also be referred to as common mode harmonics or a noise signal.

Embodiments disclosed herein relate generally to systems for converting power. In one example, the system for converting power includes a power source/supply and a load. Also, the system includes a first converter and a second converter. Moreover, the power source/supply may include an electrical generator, in one example. Furthermore, in one embodiment, the electrical generator may include a synchronous generator, a synchronous singly fed generator, an induction singly fed generator, a doubly fed generator, a brushless wound-rotor doubly fed generator, a magneto hydrodynamic generator, or combinations thereof. The load may include a power grid, an appliance, and the like. Also, the first converter and the second converter may include a direct current (DC) to alternating current (AC) converter, an AC-DC converter, a DC-DC converter, an AC-AC converter, or equivalents thereof.

Figure 1:
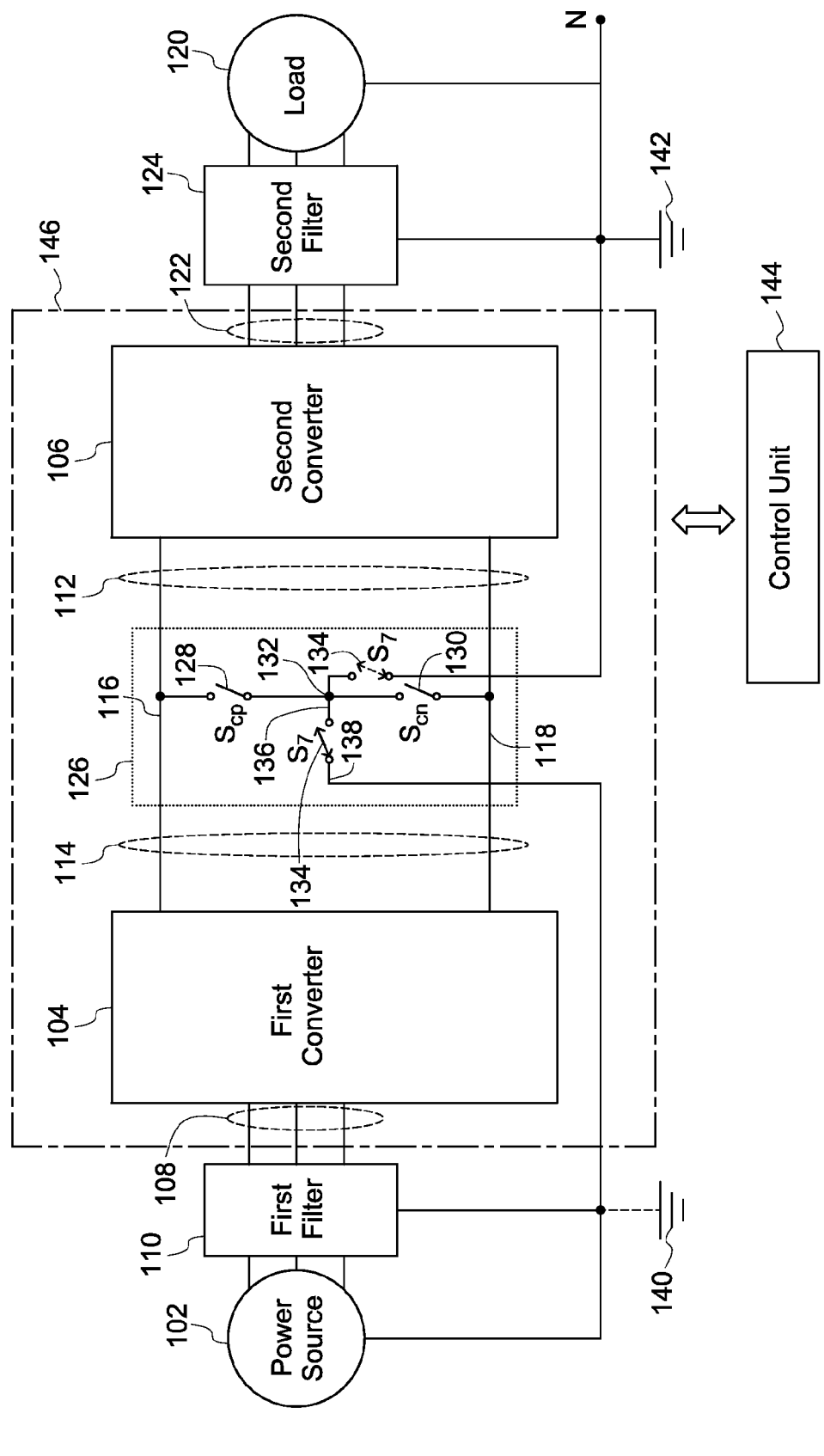
FIG. 1 is a diagrammatical representation of an exemplary system for converting power, according to aspects of the present disclosure.

Turning now to the drawings, and referring to FIG. 1, a diagrammatical representation of an embodiment of a power conversion system 100 with an exemplary phase leg 116, in accordance with aspects of the present disclosure, is depicted. The power conversion system 100 may include a power source 102. The term power source 102 may include one or more phases. In one example, the power source 102 may include a three phase power source/supply or a six phase power source/supply. Furthermore, the system 100 may include a first converter 104 and a second converter 106. In one non-limiting example, the first converter 104 may form a rectification stage and the second converter 106 may form an inversion stage. Furthermore, the combination of the first converter 104 and the second converter 106 may generally be representative of a matrix converter. Also, a first port 108 of the first converter 104 may be operatively coupled to the power source 102. Additionally, in one embodiment, the first port 108 of the first converter 104 may be operatively coupled to the power source 102 via a first filter 110. Moreover, a first port 112 of the second converter 106 may be operatively coupled to a second port 114 of the first converter 104. In one embodiment, the first port 112 of the second converter 106 may be operatively coupled to the second port 114 of the first converter 104 using a direct current bus. In the present example, the direct current bus may include a first bus line 116 and/or a second bus line 118.

In the presently contemplated configuration, a load 120 may be operatively coupled to a second port 122 of the second converter 106. In one embodiment, the load 120 may be operatively coupled to the second port 122 of the second converter 106 via a second filter 124. The term load as used herein may include one or more phases. The load may include a three phase load, a six phase load and the like, in one example.

In accordance with exemplary aspects of the present disclosure, the system 100 may include a phase leg 126. In one embodiment, the first converter 104, the second converter 106, and the phase leg 126 may collectively be referred to as a power conversion device 146. In one non-limiting example, the phase leg 126 may be configured to reduce common mode signals introduced into the system 100 and the power conversion device 146, in particular, by the power source 102 and/or the load 120. The common mode signals may be introduced into the system 100 by a pulsating condition of the load 120, in one example. In one embodiment, the phase leg 126 may be operatively coupled between the first converter 104 and the second converter 106. The first converter 104, the second converter 106, and the phase leg 126 may be packaged as a single unit, in one embodiment.

Additionally, in one embodiment, one end of the phase leg 126 may be operatively coupled to the first bus line 116, while the other end of the phase leg 126 may be operatively coupled to the second bus line 118. Furthermore, in one embodiment, the phase leg 126 may include a first unidirectional switch 128 and a second unidirectional switch 130. The term unidirectional switch as used herein may be a unidirectional controlled switch. Also, the term operatively coupled as used herein may include wired coupling, wireless coupling, electrical coupling, magnetic coupling, radio communication, software based communication, or combinations thereof. Furthermore, the operative coupling may also be achieved employing an AC bus, a DC bus, and the like. It may be noted that although the switches 128, 130 are depicted as unidirectional switches, in some embodiments, these switches 128, 130 may include bidirectional switches.

Moreover, the second unidirectional switch 130 may be operatively coupled to the first unidirectional switch 128. In one example, the second unidirectional switch 130 may be operatively coupled to the first unidirectional switch 128 via a connecting node 132. The phase leg 126 may also include a first bidirectional switch 134. The term bidirectional switch as used herein is used to refer to a switch that is capable of conducting currents and blocking voltages of both polarities. In particular, the bidirectional switch may be a bidirectional controlled switch. A first end 136 of the first bidirectional switch 134 may be operatively coupled to the first unidirectional switch 128 and the second unidirectional switch 130. To effect this coupling, the first end 136 of the first bidirectional switch 134 may be operatively coupled to the connecting node 132, in one example.

Furthermore, a second end 138 of the first bidirectional switch 134 may be operatively coupled to a common terminal 140 on a power source side or a common terminal 142 on a load side. By way of example, if the second end 138 of the first bidirectional switch 134 is operatively coupled to the common terminal 140 on the power source side, then the second end 138 of the first bidirectional switch 134 may not be operatively coupled to the common terminal 142 on the load side and vice versa. The common terminal 140 on the power source side and/or the common terminal 142 on the load side may include a neutral point, a ground terminal, an earth terminal, and the like. In one non-limiting example, in FIG. 1 reference numerals 140 and 142 are generally representative of a ground terminal In one embodiment, the first converter 104 may include a second bidirectional switch (not shown). Also, the second converter 106 may include a third unidirectional switch (not shown). In accordance with one embodiment, the first unidirectional switch 128, the second unidirectional switch 130, and the third unidirectional switch may be substantially similar switches. Moreover, in one embodiment, the first unidirectional switch 128, the second unidirectional switch 130, the first bidirectional switch 134, the second bidirectional switch, and the third unidirectional switch may include a semiconductor switch. The semiconductor switch may include a diode, a silicon based switch, a silicon carbide based switch, a gallium nitride based switch, an insulated gate bipolar transistor (IGBT), a metal oxide semiconductor field effect transistor (MOSFET), a junction gate field effect transistor (JFET), a thyristor, and the like. The bidirectional switch may be realized with discrete unidirectional semiconductor switches arranged in various arrangements. The first bidirectional switch 134 and the second bidirectional switch may include an arrangement of at least two semiconductor switches, in one example. The term arrangement of at least two semiconductor switches as used herein may include a parallel connection, an anti-parallel connection, a series connection, or a combination of parallel and series connections of at least two semiconductor switches. Moreover, the first bidirectional switch 134 and the second bidirectional switch may include a diode bridge with a switch, common collector back to back IGBT switches, common emitter back to back IGBT switches, or a reverse blocking insulated gate bipolar transistor (RB-IGBT), in one example.

Additionally, the system 100 may also include a protection circuit (not shown) and a control unit 144. The protection circuit may be configured to protect the different components of the system 100 from undesirable fluctuations in voltage and/or current. Furthermore, the protection circuit may include a voltage clamping circuit that may be disposed at the input and/or output of the power conversion device 146.

The control unit 144 may be configured to control the operation of different components of the system 100. In accordance with one embodiment, the control unit 144 may include a digital to analog converter (DAC), an analog to digital converter (ADC), a field-programmable gate array (FPGA), a digital signal processor (DSP), a microcontroller, and the like. However, in another embodiment, the control unit 144 may include a computing device (not shown). Furthermore, the control unit 144 may be configured to control the operation of the first converter 104, the second converter 106, and the phase leg 126. To that end, the control unit 144 may be configured to control a switching pattern of the first unidirectional switch 128, the second unidirectional switch 130, and/or the first bidirectional switch 134. In a similar fashion, the control unit 144 may also be configured to control a switching pattern of the second bidirectional switch and the third unidirectional switch in the first and second converters 104, 106.

In accordance with aspects of the present disclosure, the control unit 144 may also be configured to store and/or process switching patterns corresponding to the switches in the phase leg 126 and the first and second converters 104, 106. The first unidirectional switch 128, the second unidirectional switch 130, the first bidirectional switch 134, the second bidirectional switch, and/or the third unidirectional switch may be activated and/or deactivated based on a switching pattern. The switching patterns corresponding to the switches in the first and second converters 104, 106 may provide one or more switching states of the power conversion device 146. Furthermore, the switching pattern of the switches in the phase leg 126 may provide an additional switching state for the power conversion device 146. These additional switching states aid in reducing the effect of common mode signals introduced in the system 100. The additional switching state provided by the phase leg 126 will be explained in greater detail with reference to FIGS. 2 and 4.

Moreover, in one embodiment, the switching pattern of the switches in the power conversion device 146 may be based on a modulation technique. The modulation technique may include a pulse width modulation technique, a hysteresis modulation technique, a space vector modulation technique, a pulse density modulation technique, and the like. Also, in another embodiment, the control unit 144 may include a commutation circuit (not shown) and a triggering circuit (not shown). The commutation circuit may be configured to commutate and/or deactivate the switches in the first converter 104, the second converter 106, and the phase leg 126. Furthermore, the triggering circuit may be configured to activate the switches in the first converter 104, the second converter 106, and the phase leg 126, in one example. Accordingly, the commutation circuit and triggering circuit aid in the activation and/or de-activation of the switches in the first converter 104, the second converter 106, and the phase leg 126. In addition, the control unit 144 may include a gate driver circuit (not shown). The gate driver circuit may be configured to produce a high-current drive for powering the switches in the first converter 104, second converter 106, and the phase leg 126.

In one embodiment, the first converter 104 and/or the second converter 106 may include three or more legs. Also, the first converter 104 and the second converter 106 may include a dual active bridge converter, a single active bridge converter, and the like. In yet another embodiment, the first converter 104 and the second converter 106 may include a voltage source converter, a current source converter, or equivalents thereof. Moreover, the first converter 104 and the second converter 106 may also include a multi-level pulse width modulation converter, a two-level pulse width modulation converter, a three-level pulse width modulation converter, a multi-point converter, a neutral point clamped converter, or combinations thereof. The configuration of the first converter 104 and the second converter 106 will be described in greater detail with reference to FIG. 2.

Figure 2:
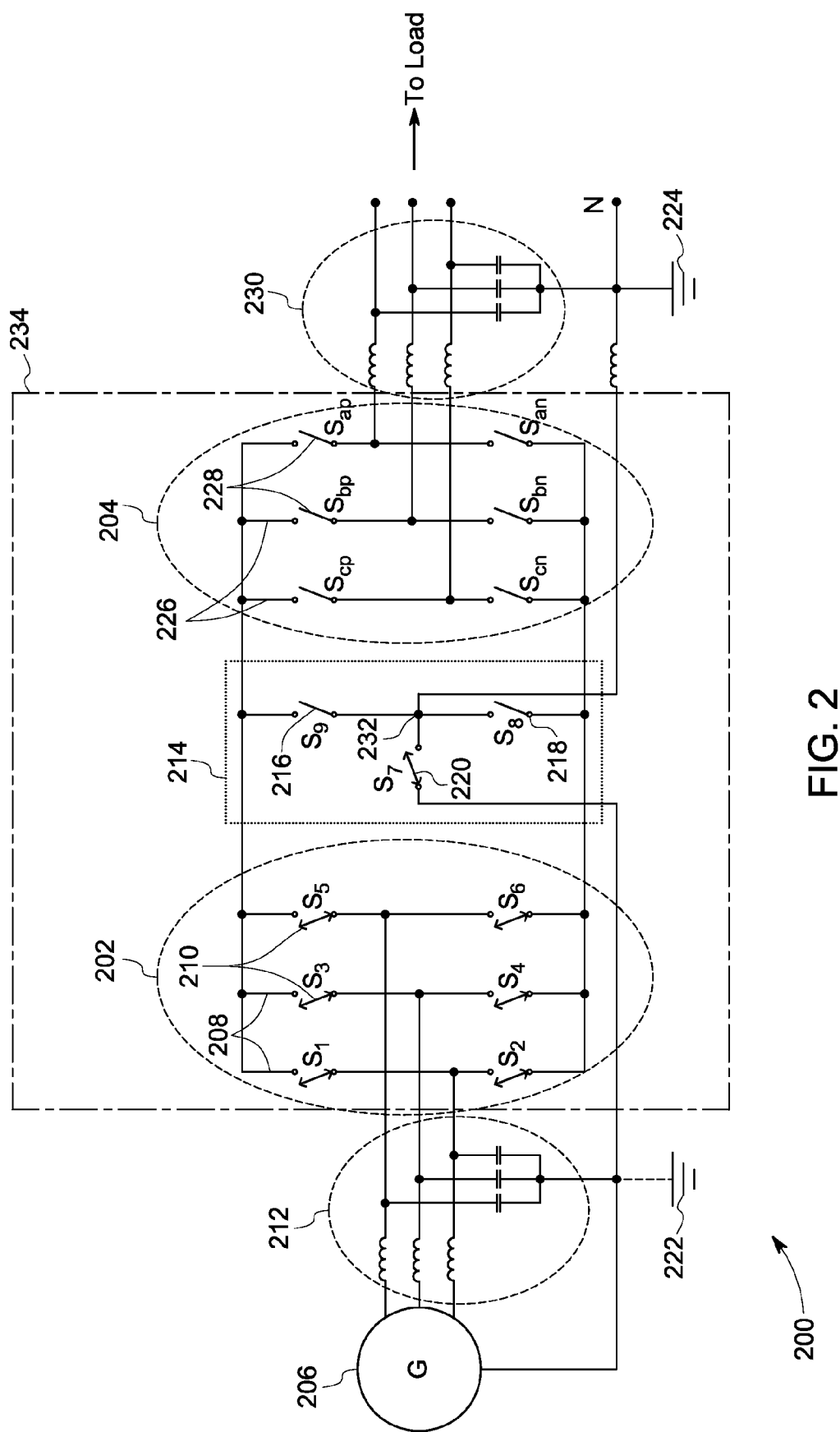
FIG. 2 is a diagrammatical representation of an exemplary embodiment of the system for converting power of FIG. 1, according to aspects of the present disclosure.

Referring now to FIG. 2, diagrammatical representation 200 of an exemplary embodiment of a portion of the system for converting power 100 of FIG. 1 is depicted. In the present example, the system 200 may include a first converter 202, such as the first converter 104 of FIG. 1 and a second converter 204, such as the second converter 106 of FIG. 1. In one example, the first converter 202 may be an AC to DC converter and the second converter 204 may be a DC to AC converter. The AC to DC converter 202 may be operatively coupled to a power source, such as a generator 206. Also, the AC to DC converter 202 may include three legs 208, in one example. Furthermore, each leg 208 may include bidirectional switches 210. These bidirectional switches 210 may generally be referred to as second bidirectional switches. The generator 206 may be operatively coupled to the AC to DC converter 202 via a first filter 212. In one non-limiting example, the first filter 212 may be a capacitive filter and/or an inductive filter.

In a presently contemplated configuration, the system 200 may include an exemplary phase leg 214, such as the phase leg 126 of FIG. 1. Furthermore, the phase leg 214 may be operatively coupled between the AC to DC converter 202 and the DC to AC converter 204. Moreover, the phase leg 214 may include a first unidirectional switch 216 and a second unidirectional switch 218. Also, in one embodiment, the second unidirectional switch 218 may be operatively coupled to the first unidirectional switch 216 at node 232. As previously noted, in another embodiment, the switches 216, 218 may include bidirectional switches. In addition, the phase leg 214 may include a first bidirectional switch 220. One end of the first bidirectional switch 220 may be operatively coupled to at least one of the first unidirectional switch 216 and the second unidirectional switch 218. Additionally, the other end of the first bidirectional switch 220 may be operatively coupled to a ground terminal 222 at the generator side. Also, the node 232 between the first unidirectional switch 216 and the second unidirectional switch 218 may be operatively coupled to a ground terminal 224 on a load side. The DC to AC converter 204 may also include three legs 226. Also, each of the three legs 226 may include unidirectional switches 228. These unidirectional switches 228 may generally be referred to as third unidirectional switches. Furthermore, the DC to AC converter 204 may be operatively coupled to a load such as the load 120 of FIG. 1 via a second filter 230. In the example of FIG. 2, the second filter 230 may be an inductive and/or a capacitive filter.

The first converter 202, the second converter 204, and the phase leg 214 may generally be referred to as a power conversion device 234. In accordance with a presently contemplated configuration, the system 200 may also include a control unit such as the control unit 144 of FIG. 1 configured to store and/or process switching patterns corresponding to the switches in the phase leg 214 and the first and second converters 202, 204. The switching patterns corresponding to the switches in the first and second converters 202, 204 may provide one or more switching states of the power conversion device 234, as noted hereinabove. In one non-limiting example, switching patterns corresponding to the bidirectional switches $S_1, S_2, S_3, S_4, S_5, S_6$ in the first converter 202 and switching patterns corresponding to the unidirectional switches $S_{ap}, S_{an}, S_{bp}, S_{bn}, S_{cp}$, and $S_{cn}$ in the second converter 204 may be used to activate and/or deactivate the switches to generate one or more switching states. In addition, the switching patterns corresponding to the switches $S_7$, $S_8$, $S_9$ in the phase leg 214 may provide additional switching states by activating and/or deactivating the first unidirectional switch $S_9$ 216, the second unidirectional switch $S_8$ 218, and the first bidirectional switch $S_7$ 220. These additional switching states aid in reducing the effect of common mode signals introduced in the system 200.

In accordance with further aspects of the present disclosure, in one embodiment, the AC to DC converter 202 may include six legs and the DC to AC converter 204 may include three legs. Also, in another embodiment, the AC to DC converter 202 may be operatively coupled to a plurality of DC to AC converters 204. The plurality of DC to AC converters 204 may be operatively coupled in parallel to each other, in one example. Also, each of the plurality of DC to AC converters 204 may be operatively coupled to respective loads.

Figure 3:
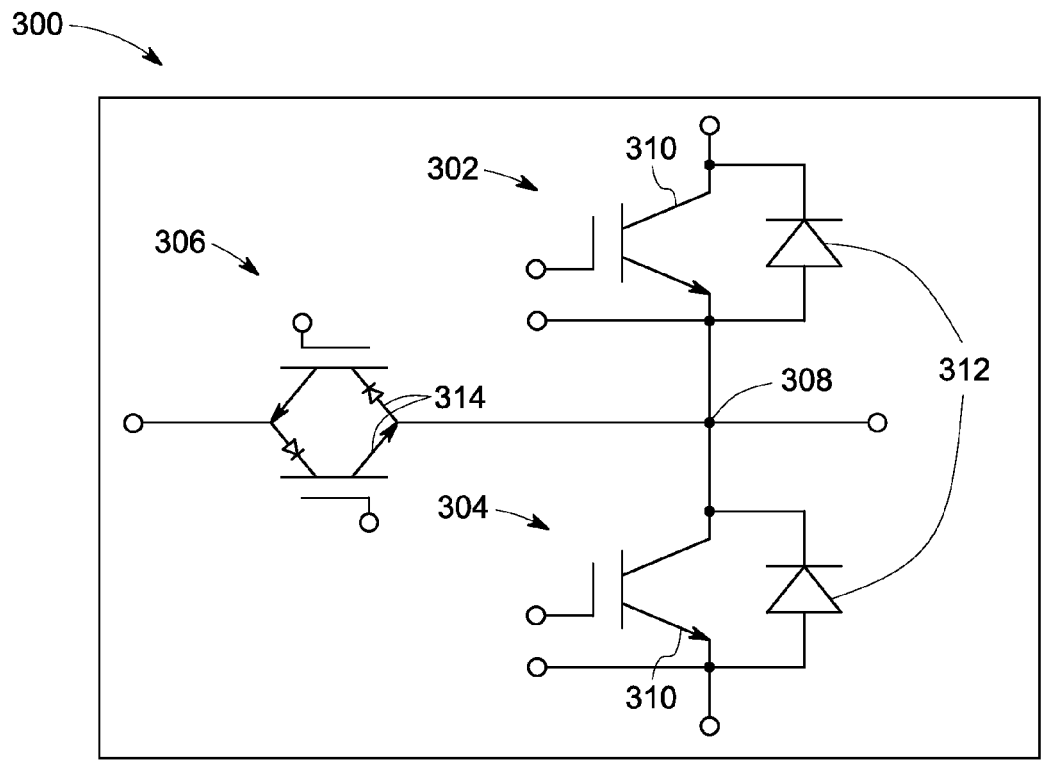
FIG. 3 is a diagrammatical representation of an exemplary embodiment of a phase leg in the system of FIG. 2, according to aspects of the present disclosure.

FIG. 3 is a diagrammatical representation of an exemplary embodiment 300 of the phase leg 214 of FIG. 2 is depicted, by way of a non-limiting example. In the present example, the phase leg 300 may include a first unidirectional switch 302, a second unidirectional switch 304, and a first bidirectional switch 306. The first bidirectional switch 306 is operatively coupled to the first unidirectional switch 302 and the second unidirectional switch 304 via a connecting node 308. In one non-limiting example, the first unidirectional switch 302 and the second unidirectional switch 304 may include an IGBT 310. Furthermore, the IGBT 310 may be operatively coupled in a parallel and/or anti-parallel configuration with a diode 312. Also, the first bidirectional switch 306 may include two anti-parallel RB-IGBTs 314, in one embodiment. As previously noted, the phase leg 300 is configured to reduce the common mode signals introduced into a power conversion system based on a condition of a power source and/or load.

Figure 4:
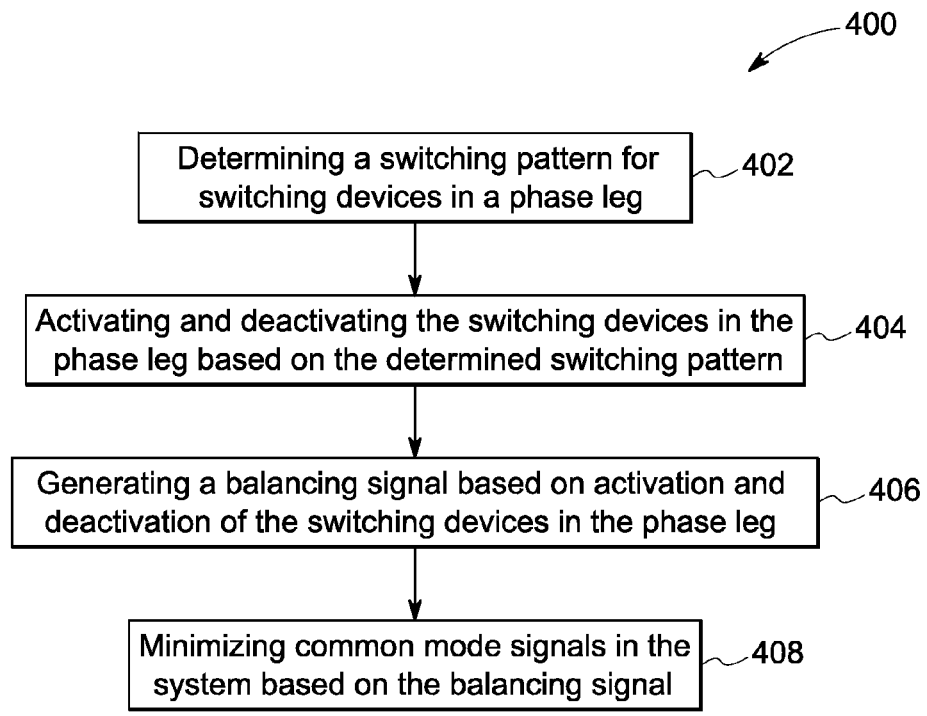
FIG. 4 is a flow chart representing a method for converting power, according to aspects of the present disclosure.

Turning now to FIG. 4, a flow chart 400 representing a method for converting power is depicted. In particular, the method for converting power entails reducing common mode signals in a system for converting power. For ease of understanding, the method is described with reference to the elements of FIG. 1. As previously noted, an exemplary phase leg such as the phase leg 126 of FIG. 1 is operatively coupled between a first converter 104 and a second converter 106. In one embodiment, the method for converting power in a system, such as the system 100 of FIG. 1, may be coordinated by a control unit, such as the control unit 144 of FIG. 1. The method begins at a step 402, where the control unit 144 may be configured to determine a switching pattern corresponding to switches in the phase leg 126. By way of example, the switching patterns corresponding to the first unidirectional switch 128, the second unidirectional switch 130, and the first bidirectional switch 134 in the phase leg 126 may be determined Also, the control unit 144 may be configured to determine a switching pattern of the second bidirectional switch in the first converter 104 and the third unidirectional switch in the second converter 106.

Furthermore, at step 404, one or more of the first unidirectional switch 128, the second unidirectional switch 130, and the first bidirectional switch 134 in the phase leg 126 may be activated and/or deactivated based on the switching pattern determined at step 402. As previously noted, based on the switching pattern, the second bidirectional switch in the first converter 104 and the third unidirectional switch in the second converter 106, may also be activated and/or deactivated. This activation and/or deactivation of the various switches in the first and second converters 104, 106 may provide one or more switching states of the power conversion device 146. Also, the activation and/or deactivation of the first unidirectional switch 128, the second unidirectional switch 130, and the first bidirectional switch 134 in the phase leg 126 may provide an additional switching state of the power conversion device 146 in addition to the one or more switching states provided by the switches in the first and second converters 104, 106. By way of example, the additional switching state may include operatively coupling the common terminal 142 on the load side to the first bus line 116 by activating the first bidirectional switch 134 and the first unidirectional switch 128 in the phase leg 126. In a similar fashion, activating the first bidirectional switch 134 and the first unidirectional switch 128 may result in operatively coupling the common terminal 140 on the power source side to the first bus line 116. Similarly, activating the first bidirectional switch 134 and the second unidirectional switch 130 may result in operatively coupling the common terminal 140 on the power source side to the second bus line 118.

In addition, at step 406, a balancing signal may be determined based on the activation and/or deactivation of the first unidirectional switch 128, the second unidirectional switch 130, and the first bidirectional switch 134 in the phase leg 126. Furthermore, the balancing signal may also be determined based on the activation and/or deactivation of the second bidirectional switch and/or the third unidirectional switch, in combination with the activation and/or deactivation the switches in the phase leg 126. The balancing signal may include a voltage, a current, or a combination thereof. Furthermore, the term balancing signal as used herein is used to refer a signal which is used to minimize the common mode signals. As previously noted, the common mode signals may be introduced into the system 100 by the power source 102 and/or the load 120.

Also, at step 408, common mode signals may be minimized In particular, the balancing signal generated at step 406 may be employed to minimize the common mode signals introduced in the system 100. The common mode signals may include variations in the voltage and current waveforms of the system 100. Moreover, the term variations as used herein may be a variation in magnitude, phase, frequency, or equivalents thereof. Furthermore, as noted hereinabove, the common mode signals may also be referred to as noise signals. In a non-limiting example, if the common mode signal has a certain magnitude and phase, the balancing signal generated at step 406 may be such that the balancing signal has a magnitude and phase substantially opposite to that of the common mode signal. Accordingly, the balancing signal may be employed to minimize the common mode signal. Reducing the common mode signals thereby aids in providing a fluctuation free voltage waveform and/or current waveform for the system 100.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The system for converting power and the methods for converting power described hereinabove aid in minimizing common mode signals in a power conversion system. Furthermore, the system circumvents the need for bulky passive components for power conversion such as a DC link capacitor, boost inductors, and the like, thereby providing a compact system. Also, the system provides an additional degree of freedom to operate the power conversion device in a full or degraded mode under certain fault conditions. Moreover, the method and system described hereinabove aid in minimizing harmonics, vibrations and power loss during non-linear and/or pulsating loads in a generator. In addition, the system may provide an opportunity to lower semiconductor losses. The system for converting power may find application in variable speed constant frequency (VSCF) generation in aviation systems, an uninterrupted power supply system, integrated motor drives, electric vehicles, and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A power conversion device, comprising:
a first converter;
a second converter operatively coupled to the first converter;
a phase leg operatively coupled between the first converter and the second converter and comprising:
a first unidirectional switch;
a second unidirectional switch operatively coupled to the first unidirectional switch; and
a first bidirectional switch, wherein a first end of the first bidirectional switch is operatively coupled to at least one of the first unidirectional switch and the second unidirectional switch.

2. The device of claim 1, wherein a second end of the first bidirectional switch is operatively coupled to a common terminal on a power source side.

3. The device of claim 1, wherein a second end of the first bidirectional switch is operatively coupled to a common terminal on a load side.

4. The device of claim 1, wherein the second converter comprises a third unidirectional switch.

5. The device of claim 4, wherein the first unidirectional switch, the second unidirectional switch, and the third unidirectional switch comprise a semiconductor switch.

6. The device of claim 1, wherein the first converter comprises a second bidirectional switch.

7. The device of claim 6, wherein the first bidirectional switch and the second bidirectional switch comprise one or more semiconductor switches, a reverse blocking insulated gate bipolar transistor, an insulated gate bipolar transistor, a metal oxide semiconductor field effect transistor, or a combination thereof.

8. The device of claim 1, wherein the phase leg is configured to reduce a common mode signal induced in the power conversion device by a power source, a load or both the power source and the load.

9. The device of claim 8, wherein the common mode signal comprises a common mode voltage, a common mode current, or a combination thereof.

10. The device of claim 1, wherein the first converter comprises an alternating current to direct current converter.

11. The device of claim 1, wherein the second converter comprises a direct current to alternating current converter.

12. The device of claim 1, wherein the second converter is operatively coupled to the first converter using a first bus line, a second bus line, or both the first bus line and the second bus line.

13. A system, comprising:
a power source;
a first converter, wherein a first port of the first converter is operatively coupled to the power source;
a second converter, wherein a first port of the second converter is operatively coupled to a second port of the first converter;
a load operatively coupled to a second port of the second converter;
a phase leg operatively coupled between the first converter and the second converter, and comprising:
a first unidirectional switch;
a second unidirectional switch operatively coupled to the first unidirectional switch; and
a first bidirectional switch, wherein a first end of the first bidirectional switch is operatively coupled to at least one of the first unidirectional switch and the second unidirectional switch.

14. The system of claim 13, further comprising a first filter, a second filter, a control unit, or combinations thereof.

15. The system of claim 13, wherein the control unit is configured to regulate the switching of the first unidirectional switch, the second unidirectional switch, the first bidirectional switch, a second bidirectional switch, a third unidirectional switch, or combinations thereof.

16. The system of claim 13, wherein the load, the power source, or both the load and the power source comprise one or more phases.

17. The system of claim 13, wherein the first port of the second converter is operatively coupled to the second port of the first converter using a first bus line and a second bus line.

18. A method for converting power, the method comprising:
determining a switching pattern of one or more switches in a phase leg using a control unit;

at least one of activating or deactivating the one or more switches in the phase leg based on the determined switching pattern;

generating a balancing signal based on the at least one of activating or deactivating the one or more switches in the phase leg; and minimizing a common mode signal in a system employing the balancing signal.

19. The method of claim 18, wherein the balancing signal comprises a voltage, a current, or a combination thereof.

20. The method of claim 18, wherein generating the balancing signal comprises:

determining a magnitude and a phase of the common mode signal; and generating the balancing signal such that a magnitude and a phase of the balancing signal is opposite to the magnitude and the phase of the common mode signal.

* * * * *